UNITED STATES PATENT OFFICE.

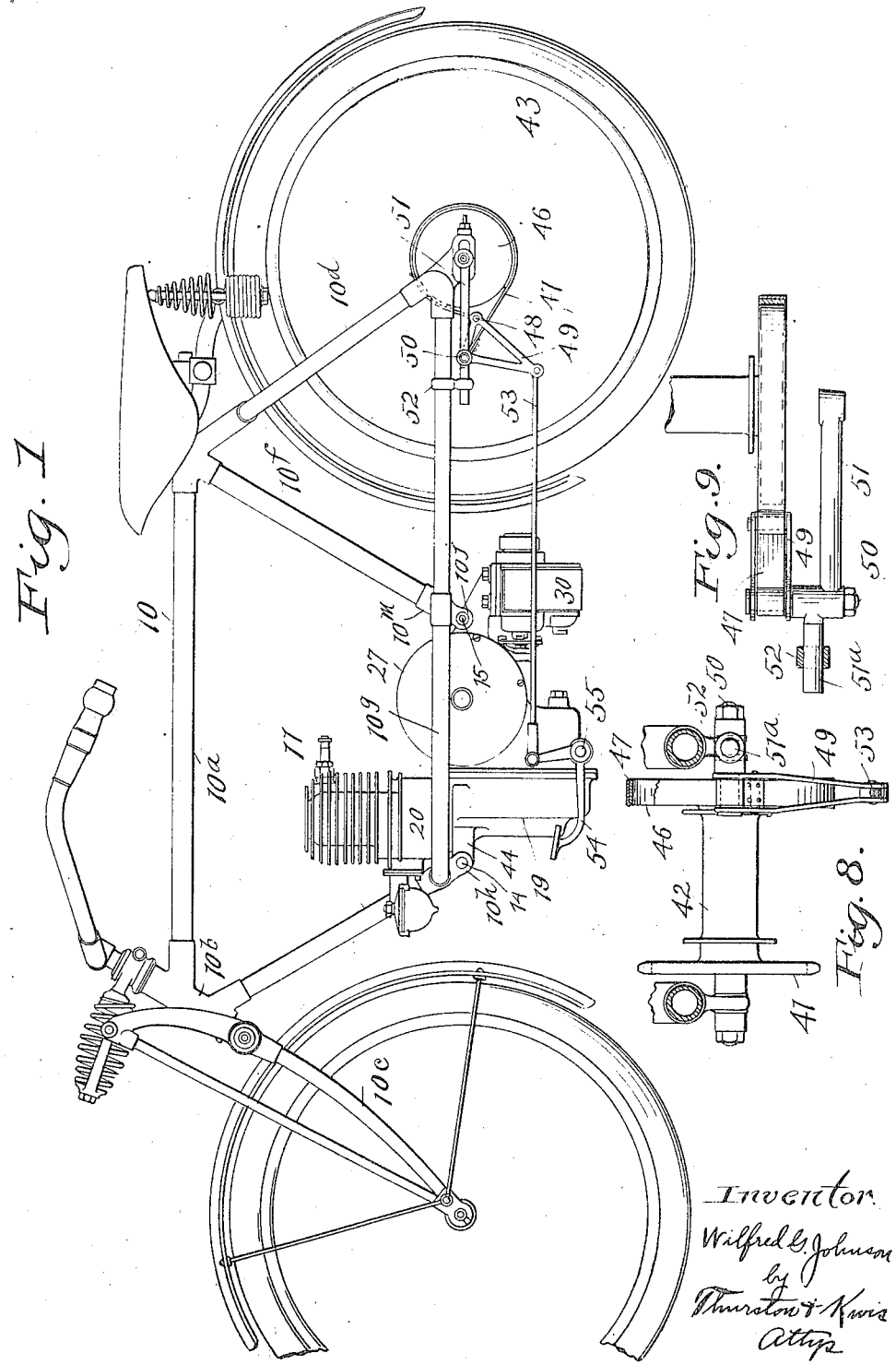

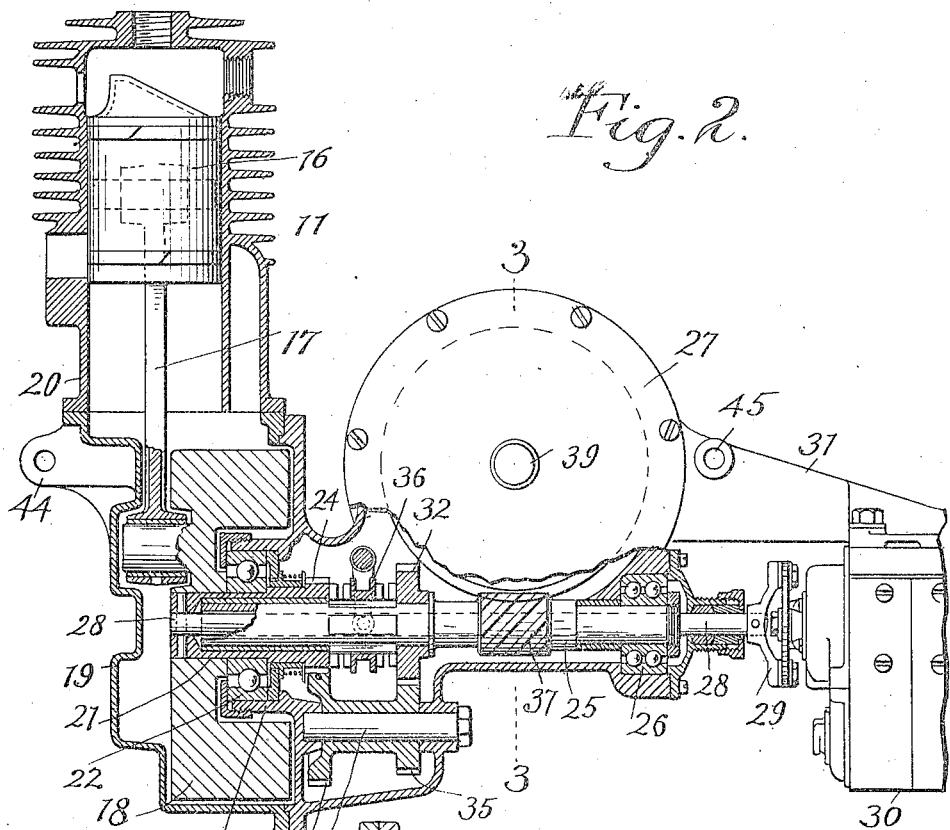
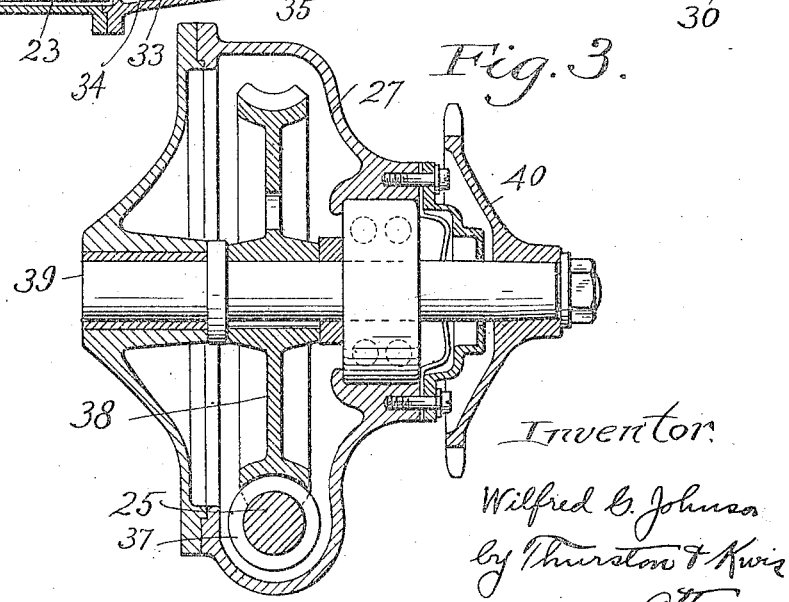

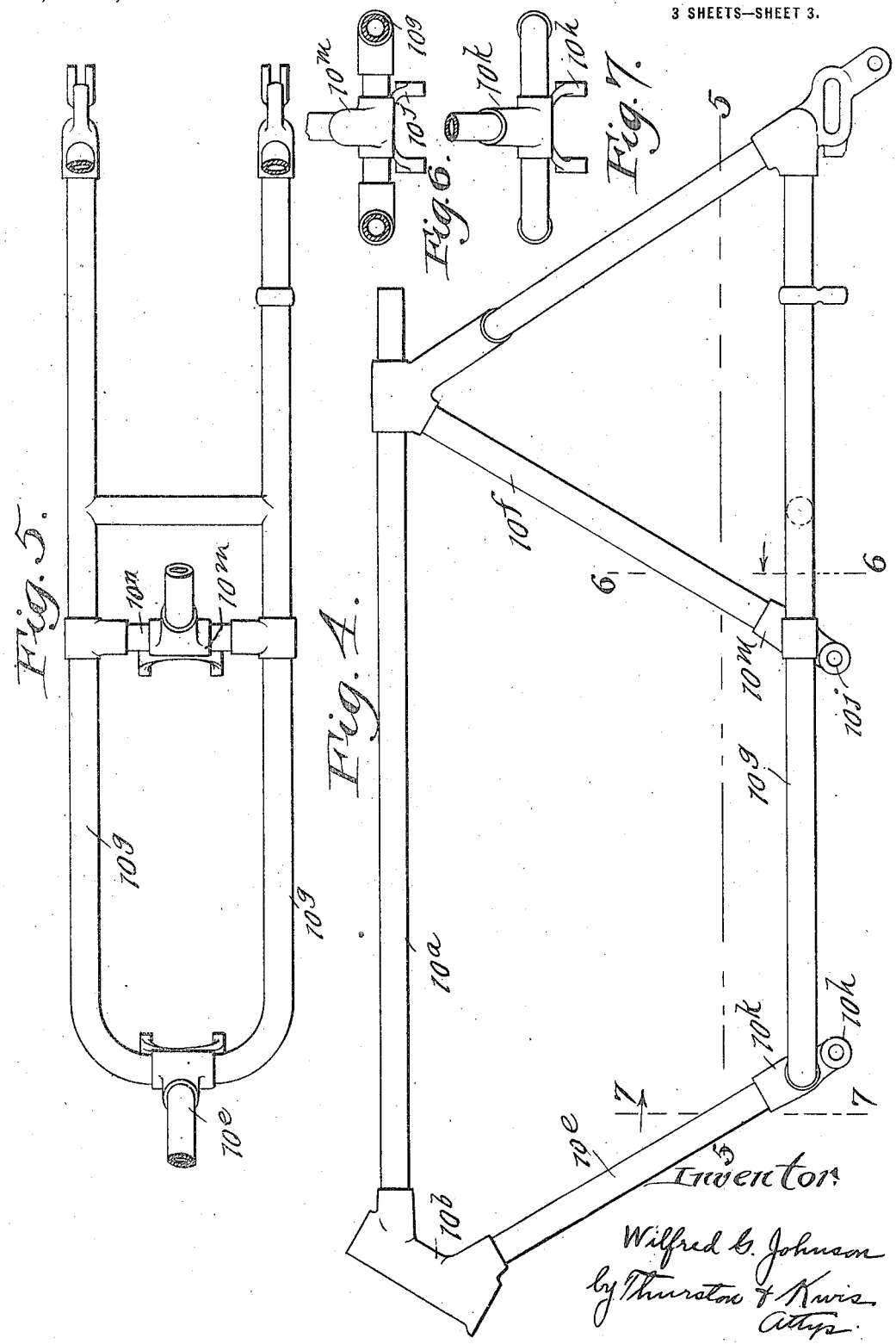

WILFRED G. JOHNSON, OF ELYRIA, OHIO, ASSIGNOR TO W. B. D. ALEXANDER, OF CLEVELAND, OHIO.

MOTOR-CYCLE.

1,157,547. Specification of Letters Patent. Patented Oct. 19, 1915.

Application filed May 22, 1915. Serial No. 29,713.

*To all whom it may concern:*

Be it known that I, WILFRED G. JOHNSON, a citizen of the United States, residing at Elyria, in the county of Lorain and State of Ohio, have invented a certain new and useful Improvement in Motor-Cycles, of which the following is a full, clear, and exact description.

This invention relates to motor cycles and has for its chief object to provide a construction which is efficient and durable, light in weight compared with motor cycles in use at the present time, and the parts of which are compactly arranged, inexpensive to manufacture and assemble, and accessible for adjustment, replacement or repairs.

The invention constituting the subject of this application resides particularly in the power plant including the transmission and the manner of supporting the same on the frame.

Additionally, the invention resides in certain features of construction of the frame which is shaped and constructed to accommodate a unit power plant and to admit of the suspension and supporting of the latter in the manner to be hereinafter described.

The invention resides also in the construction and arrangement of certain parts of the engine, transmission and magneto.

The invention may be further briefly summarized as consisting in certain novel details of constructions and combinations and arrangements of parts which will be described in the specification and set forth in the appended claims.

In the accompanying sheets of drawings wherein I have illustrated the preferred embodiment of my invention, Figure 1 is a side view of a motor cycle equipped with my invention; Fig. 2 is an enlarged view, with parts in vertical section and parts in side elevation, of a power plant transmission and magneto unit constructed in accordance with my invention; Fig. 3 is a transverse sectional view substantially along the lines 3—3 of Fig. 2; Fig. 4 is a side view of the frame; Fig. 5 is a horizontal sectional view of the same substantially along the line 5—5 of Fig. 4; Figs. 6 and 7 are sectional views, respectively, along the lines 6—6 and 7—7 of Fig. 4; Fig. 8 is a detail view with parts in elevation and parts in section, the section being taken through the lower part of the frame adjacent the axle of the rear wheel; Fig. 9 is a detail plan view showing particularly the brake and part of the elements which coöperate therewith.

Referring now to the drawings, 10 represents the frame as a whole composed of the upper horizontal tube $10^a$, the front or steering head $10^b$ which supports the steering fork $10^c$, the rear fork $10^d$, the inclined downwardly projecting tubes $10^e$ and $10^f$ which project downwardly from the steering head and seat head, respectively, and lower U-shaped tube or tubes $10^g$ which connect the members $10^e$, $10^f$ and $10^d$ and composed of two parallel arms extending from the front member $10^e$ to the rear member $10^d$ on both sides of the power plant. The U-shaped part $10^g$ may be formed of one continuous tube or of two tubes joined at their front ends. At the lower ends of the members $10^e$ and $10^f$ are power plant hangers in the form of forks $10^h$ and $10^j$ on which the engine 11, transmission and magneto which constitute a unitary structure, are supported by means of two bolts 14 and 15. The power plant which is thus supported by the two-point suspension between the tubes $10^g$ can be very easily placed in position or removed when removal is desired. It will be observed that these forks $10^h$ and $10^j$ are formed on fittings or sleeves $10^k$ and $10^m$, one at the forward end of the tubes $10^g$ and the other on a cross tube $10^n$ extending between the tubes $10^g$. The downwardly extending tubes $10^e$ and $10^f$ are fitted into the sleeves $10^k$ and $10^m$, and as the forks $10^h$ and $10^j$ are at the lower ends of and in line with the tubes or frame members $10^e$ and $10^f$, the power plant and transmission unit in which a great part of the weight of the motor cycle is incorporated has little tendency to bend or produce any stresses likely to break or weaken the frame at any point.

The engine 11 is preferably a single cylinder two-cycle engine whose piston 16 is connected by the connecting rod 17 to a fly wheel 18 adapted to revolve in a plane at right angles to the motor cycle frame. This fly wheel which is inclosed within a casing 19 bolted on to the cylinder casting 20 has at the center a recess or opening in which is secured a shaft-driving sleeve 21 rotatably supported in a ball and ring bearing 22 which in turn is supported by an inturned flange 23 on the side of the fly wheel casing 19. It will be observed that the fly wheel is recessed to accommodate the flange 23 and the coöperating members of the ball and ring bearing 22. By means of this bearing, both the sleeve 21 and the fly wheel are supported. The outer end of the sleeve 22 is formed with teeth so as to constitute a gear wheel 24 which forms one element of a two-speed transmission to be referred to presently.

Mounted to rotate in the sleeve 21 is a hollow transmission shaft 25 which extends from the fly wheel rearwardly of the motor cycle. This hollow shaft is rotatably supported at its forward end in the sleeve 21 and at its rear end is supported in a ball and ring bearing 26 which in turn is supported on a part of the transmission casing 27 secured to and forming a continuation of the fly wheel casing 19. Extending centrally through this hollow shaft 25 is a magneto driving shaft 28, which at its forward end is fastened to the sleeve 21 (which as before stated, is fixed to the fly wheel) and at its rear end is connected by a coupling 29 to a magneto 30 which is bolted to an extension 31 of the transmission casing 27. It will be observed that the magneto shaft has a fixed driving connection with the engine, that is to say, it is driven at a fixed or constant speed relative to the speed of the engine, but not necessarily by the specific connecting or driving means here shown.

Between the engine and the shaft 25 there is a variable speed transmission which includes in addition to the gear 24 fixed to or integral with the sleeve 21, a gear 32 normally loose on the shaft 25, a counter or idler shaft 33 supported in bearings formed on the fly wheel and the transmission casings, which countershaft has fixed to it a double or twin gear including a gear 34 which meshes with the gear 24 and a gear 35 which meshes with the gear 32. Between the gears 24 and 32 is a clutch member 36 which is keyed or splined to the shaft 25 and is provided on opposite faces with clutch teeth or jaws adapted to coöperate with corresponding clutch teeth or jaws on the face of the gear 24 and face of the gear 32, respectively. This clutch member 36 is adapted to be shifted forwardly on the shaft 25 so as to lock the sleeve 21 to the shaft 25, in which event the shaft 25 is driven at the speed of the fly wheel, and the clutch member is adapted to be shifted rearwardly so as to lock the gear 32 to the shaft 25, in which event the shaft 25 is driven at a reduced speed through the gears 24, 34, 35 and 32. When the clutch is in neutral position, that is, disengaged from both the gears 24 and 32, the engine will run idle, the shaft then being disconnected from the engine.

Between the gear 32 on the shaft and the bearing 26 which supports the rear end of the shaft 25 is a worm 37 which is engaged by a worm wheel 38 supported on a shaft 39 which is above the shaft 25 and at right angles thereto. This shaft 39 which is supported in suitable bearings in the upper part of the transmission casing 27 is provided at its right hand end with a driving sprocket wheel 40 adapted to be connected by a suitable driving chain to a rear sprocket wheel 41 (see Fig. 8) on the hub 42 of the rear wheel 43.

It will be observed that all these parts which have just been described including the engine, multi-speed transmission magneto and the various driving shafts constitute a unitary structure which can be attached to the motor cycle as a unit or removed as a unit therefrom. This unit structure, as before stated, is supported by a two-point suspension by the forks $10^h$ and $10^j$ of the frame. The fork $10^h$ is attached to a lug or pair of ears 44 on the forward part of the engine and the fork $10^j$ is attached to the rear extension 31 of the transmission casing 27, the point of attachment being indicated at 45 in Fig. 2. It will be observed in passing that while the speed of the shaft 25 may be varied relative to the speed of the engine, the shaft 28 which extends centrally through the shaft 25 and which drives the magneto is at all times driven at the speed of the engine.

The hub of the rear wheel 43 is provided with a brake drum 46 which is surrounded by a brake band 47, one end of which is fastened at 48 to a pair of triangular-shaped brake levers 49 which are pivoted on a stud 50 to which the opposite end of the brake band is anchored, which stud is carried by a member 51, the rear end of which has a hub or boss through which the axle of the rear wheel extends and the forward end $51^a$ of which passes through a hanger 52 fixed to one of the arms or tubes $10^g$ at the lower part of the frame. The triangular-shaped brake levers which are preferably steel punchings are on opposite sides of the brake band, and their lower ends are connected by a brake rod 53 to a brake pedal 54 supported on a foot rest 55 at the lower central part of the motor cycle. This brake mechanism has the chief advantage that if the rear wheel 43 is shifted to adjust the tension of the driving sprocket chain the anchorage point of the brake band, even though it is supported indirectly on the motor cycle frame, is not varied with respect to the center of the brake drum nor with respect to the other parts of the brake.

The brake mechanism and the frame of the motor cycle constitute the subject matter of two separate applications filed of even date herewith.

Having described my invention, I claim:

1. In combination in a motor cycle, a frame composed of upper and lower frame members and downwardly extending members connecting the same and a power plant secured to the frame by a two-point suspension connecting the front of the power plant to the frame adjacent the lower end of one of said connecting members of the frame and adjacent the lower frame member or members.

2. In combination in a motor cycle, a frame composed of upper and lower frame members and downwardly extending members connecting the same, a power plant secured to said frame at two points adjacent the lower ends of said connecting members of the frame and adjacent the lower frame member or members.

3. In combination in a motor cycle, a frame composed of an upper frame member, a pair of lower frame members spaced apart, and downwardly extending members connecting the upper and lower members and a combined power plant and transmission located between said lower frame members and secured at its front and rear ends to the frame at points adjacent the plane of the lower frame members.

4. In combination in a motor cycle, a frame composed of an upper frame member, a pair of lower frame members spaced apart and downwardly extending members connecting the upper and lower members and a power plant located between said lower frame members and secured to the frame adjacent the lower ends of said downwardly extended connecting members of the frame and adjacent the plane of the lower frame members.

5. In combination in a motor cycle, a frame composed of an upper frame member, a pair of lower frame members and inclined members connecting the upper and lower members, said frame being provided adjacent the lower ends of said downwardly extending connecting members and adjacent the lower frame members with power plant supporting means and a power plant supported between said lower frame members on said supporting means.

6. In combination in a motor cycle, a frame composed of upper and lower frame members and downwardly extending frame members connecting the same, a power plant and transmission unit comprising an engine having a fly wheel adapted to revolve in a plane at right angles to the frame, a transmission casing secured to the engine casing and extending rearwardly therefrom, transmission shafts and gearing inclosed in said transmission casing, said engine casing being bolted at one point to the lower front part of the frame and the rear portion of the transmission casing being bolted at another point to the frame.

7. In combination in a motor cycle, a frame composed of upper and lower frame members, and downwardly extending members connecting the upper and lower frame members, hangers, one in advance of the other secured to said frame near the lower ends of said downwardly extending connecting members and adjacent said lower frame member or members, and a power plant secured to said hangers.

8. In combination in a motor cycle, a frame composed of an upper frame member, a pair of horizontally spaced lower frame members connected at their front ends, and downwardly extending members connecting the upper and lower frame members, hangers, one in advance of the other secured to said frame near the lower ends of said downwardly extending connecting members and adjacent said lower frame members and a power plant secured to said hangers between said lower frame members.

9. In combination in a motor cycle, a frame composed of an upper frame member, a pair of horizontally spaced lower frame members connected at their front ends, and downwardly extending members connecting the upper and lower frame members, hangers, one in advance of the other on said frame near the lower ends of said downwardly extending connecting members and a power plant and transmission unit secured to said hangers between said lower frame members, said power plant and transmission unit comprising an engine with a fly wheel adapted to rotate in a plane at right angles to the plane of the frame, a transmission casing extending rearwardly from the engine and transmission gears and shafts inclosed in said casing.

10. In combination in a motor cycle, a frame composed of an upper and lower frame member, and downwardly extending members connecting the upper and lower frame members, hangers one in advance of the other on said frame, and a power plant and transmission unit secured to said hangers, said power plant and transmission unit comprising an engine with a fly wheel adapted to rotate in a plane at right angles to the frame, a shaft extending rearwardly from the fly wheel and adapted to be driven thereby, a transverse shaft above said rearwardly extending shaft and gearing connecting said shafts.

11. In combination in a motor cycle, a frame composed of an upper frame member, a pair of horizontally spaced lower frame members connected at their front ends and downwardly extending members connecting the upper and lower frame members, hangers one in advance of the other secure to said frame near the lower ends of said downwardly extended connecting members, and a power plant and transmission unit secured to said hangers between said lower frame members, said power plant and transmission unit comprising an engine with a fly wheel adapted to rotate at right angles to the frame, a shaft extending rearwardly from the fly wheel, a transverse shaft above said rearwardly extending shaft, gearing connecting said shafts and multi-speed gearing between the engine and said rearwardly extending shaft.

12. In combination in a motor cycle, a frame, an engine supported by the frame, a hollow transmission shaft extending from the engine, a magneto shaft extending through said hollow shaft and having a fixed driving connection with the engine.

13. In combination in a motor cycle, a frame, an engine supported by the frame, a hollow transmission shaft extending from the engine, gearing by which said shaft may be driven at different speeds relative to the engine speed, a magneto shaft extending through said hollow shaft and having a fixed driving connection with the engine.

14. In combination in a motor cycle, a frame, an engine supported by the frame having a fly wheel adapted to rotate in a plane at right angles to the frame, a hollow driving shaft adapted to be driven by said fly wheel and extending rearwardly from the fly wheel, and a magneto shaft extending through said hollow shaft and at its forward end having a fixed driving connection with the fly wheel, and adapted to be connected to a magneto.

15. In combination in a motor cycle, a frame, an engine supported by the frame having a fly wheel adapted to rotate in a plane at right angles to the frame, a driving member located centrally of said fly wheel and adapted to rotate therewith, a hollow driving shaft adapted to be driven by said member and extending rearwardly from the fly wheel, and a magneto shaft extending through said hollow shaft and at its forward end having a fixed driving connection with the fly wheel, and adapted to be connected to a magneto.

16. In combination in a motor cycle, a frame, an engine supported on the frame and having a fly wheel adapted to rotate in a plane at right angles to the frame, a hollow member secured to said fly wheel at the center thereof, a hollow shaft supported in said hollow member and adapted to be driven thereby, a magneto shaft extending through said hollow shaft and at its forward end having a fixed driving connection with the fly wheel.

17. In combination in a motor cycle, a frame, an engine supported on the frame, and having a fly wheel adapted to rotate in a plane at right angles to the frame, a driving member at the center of the fly wheel, a hollow shaft adapted to be driven by said member, a magneto shaft extending through said hollow shaft and at its forward end having a fixed driving connection with the fly wheel, and means by which said hollow shaft may be driven by said driving member at a plurality of speeds relative to said member.

18. In combination in a motor cycle, a frame, an engine supported on the frame and having a fly wheel adapted to rotate in a plane at right angles to the frame, a hollow shaft extending rearwardly from the fly wheel and adapted to be driven thereby, a magneto shaft extending through said hollow shaft and at its forward end having a fixed driving connection with the fly wheel, and a third shaft above and at right angles to said hollow shaft and geared thereto.

19. In combination in a motor cycle, a frame, a power plant, transmission and magneto unit supported by the frame and comprising an engine, a hollow propeller shaft extending rearwardly from the engine, a magneto shaft extending through said propeller shaft and having a fixed driving connection with the engine, and a magneto connected to said magneto shaft.

20. In combination in a motor cycle, a frame, a power plant, transmission and magneto unit supported by the frame and comprising an engine, a hollow shaft extending rearwardly from the engine, gearing by which said shaft may be driven at different speeds relative to the engine speed, a magneto shaft extending through said first named shaft, a third shaft extending at right angles to the plane of the frame, gearing by which said hollow shaft may drive the third shaft, an inclosure for said shafts and gearing, and a magneto supported on said inclosure and connected to said magneto shaft.

21. A motor cycle frame composed of upper and lower frame members, downwardly extending members connecting the upper and lower frame members, and power plant hangers on said frame near the lower ends of said downwardly extending connecting members and adjacent said lower frame member or members.

22. A motor cycle frame composed of an upper frame member, a pair of horizontally spaced lower frame members connected at their front ends, downwardly extending members connecting the upper and lower frame members, and power plant hangers on the frame near the lower ends of said downwardly extending connecting members and adjacent the plane of said lower frame members.

In testimony whereof, I hereunto affix my signature in the presence of two witnesses.

WILFRED G. JOHNSON.

Witnesses:
L. I. PORTER,
A. J. HUDSON.